(12) United States Patent  
Matsumoto

(10) Patent No.: US 12,313,036 B2  
(45) Date of Patent: May 27, 2025

(54) ELECTRIC POWER GENERATING DEVICE

(71) Applicant: TOYOTA JIDOSHA KABUSHIKI KAISHA, Toyota (JP)

(72) Inventor: Takuya Matsumoto, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/399,903

(22) Filed: Dec. 29, 2023

(65) Prior Publication Data

US 2024/0263618 A1  Aug. 8, 2024

(30) Foreign Application Priority Data

Feb. 3, 2023  (JP) .................................. 2023-015271

(51) Int. Cl.
*F03D 15/00* (2016.01)

(52) U.S. Cl.
CPC .... *F03D 15/00* (2016.05); *F05B 2260/40311* (2013.01)

(58) Field of Classification Search
CPC .... F03D 15/101; F16H 37/0813; F16H 48/08; F16H 2048/082; F16H 2048/085; F16H 2048/087
See application file for complete search history.

(56) References Cited

U.S. PATENT DOCUMENTS

| | | | |
|---|---|---|---|
| 3,211,124 A * | 10/1965 | Mantle | B60F 3/0007 440/11 |
| 10,378,617 B2 * | 8/2019 | Hehenberger | F16H 3/724 |
| 2007/0117664 A1 * | 5/2007 | Shioiri | F16H 55/56 474/12 |
| 2010/0207396 A1 * | 8/2010 | Simon | H02P 9/06 290/55 |
| 2021/0309059 A1 * | 10/2021 | Ker | B64D 35/02 |
| 2023/0279842 A1 | 9/2023 | Ito et al. | |

FOREIGN PATENT DOCUMENTS

| | | | | |
|---|---|---|---|---|
| JP | 2011-190844 A | | 9/2011 | |
| KR | 20150130837 A * | | 11/2015 | ........... F03D 15/101 |

* cited by examiner

*Primary Examiner* — Stacey A Fluhart
(74) *Attorney, Agent, or Firm* — SoraIP, Inc.

(57) ABSTRACT

The electric power generating device includes a first generator, a differential gear mechanism provided between a blade and the first generator, a first ring gear connected to the first generator, and a case that rotates integrally with the first ring gear about a first axis. The differential gear mechanism includes a pinion shaft that rotatably supports a pair of pinion gears about a second axis perpendicular to the first axis. The differential gear mechanism includes a first drive shaft having a first side gear at one end and a blade connected to the other end. The differential gear mechanism comprises a second drive shaft having a second side gear at one end and having an interference portion at one end extending toward the pinion shaft. The interference portion faces the pinion shaft in a direction of a third axis that is orthogonal to the first axis and the second axis.

4 Claims, 4 Drawing Sheets

ELECTRIC POWER GENERATING DEVICE

CROSS-REFERENCE TO RELATED APPLICATION

This application claims priority to Japanese Patent Application No. 2023-015271 filed on Feb. 3, 2023, incorporated herein by reference in its entirety.

BACKGROUND

1. Technical Field

The technology disclosed in the present specification relates to an electric power generating device.

2. Description of Related Art

Japanese Unexamined Patent Application Publication No. 2011-190844 (JP 2011-190844 A) discloses an electric power generating device having gears serving as step-up gears.

SUMMARY

A vehicle transaxle includes a motor and a differential gear mechanism that absorbs a difference in revolutions between a pair of axles. Assumption will be made here regarding when a blade is disposed on one of the axles of the vehicle transaxle to generate electric power with a motor. In this case, since driving force is input only from one axle, the other axle will spin free, and the driving force is not transmitted to the motor. As a result, there is a problem that electric power cannot be generated.

The technology disclosed in the present specification is embodied in an electric power generating device.
The electric power generating device includes a blade that rotates under a flow of a fluid.
The electric power generating device includes a first generator that generates power by rotation of the blade.
The electric power generating device includes a differential gear mechanism provided between the blade and the first generator.
The differential gear mechanism includes a first ring gear connected to the first generator.
The differential gear mechanism includes a case that rotates integrally with the first ring gear about a first axis.
The differential gear mechanism includes a pinion shaft that is supported by the case and that supports a pair of pinion gears to be rotatable about a second axis orthogonal to the first axis.
The differential gear mechanism includes a first drive shaft that is disposed along the first axis, and that includes at one end a first side gear that engages the pinion gears, and also of which another end is connected to the blade.
The differential gear mechanism includes a second drive shaft that is disposed along the first axis and that includes at one end a second side gear engaged with the pinion gears and disposed facing the first side gear.
The one end of the second drive shaft is provided with an interference portion extending toward the pinion shaft.
The interference portion faces the pinion shaft in a direction of a third axis that is orthogonal to the first axis and the second axis.
The form of the electric power generating device according to the present specification is not limited in particular, as long as it is a device that generates electric power by rotating a blade. The electric power generating device according to the present specification is not limited to a wind electric power generating device, and may be, for example, a hydraulic electric power generating device. Further, the electric power generating device is not limited to a horizontal-axis electric power generating device, and may be, for example, a vertical-axis electric power generating device. According to the electric power generating device described above, the interference portion interferes with the pinion shaft, and accordingly the second drive shaft can be rotated integrally with the case. The second drive shaft does not spin free, and accordingly the ring gear and the first drive shaft can be rotated integrally. The driving force input to the first drive shaft by the blade can be appropriately transmitted to the first generator. Electric power can be generated in an electric power generating device having a differential gear mechanism on a power transmission path.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In an embodiment of the present technology, the interference portion may comprise a first interfering portion and a second interfering portion facing each other. A pinion shaft may be positioned between the first interference portion and the second interference portion. According to such a configuration, it is possible to fit the interference portion and the pinion shaft. It is possible to reliably rotate the case and the second drive shaft together.

In one embodiment of the present technology, the distance in the direction of the third axis between the first interference portion and the second interference portion may increase toward the distal end side of the interference portion. According to such a configuration, it is possible to suppress the occurrence of a gap between the first interference portion and the pinion shaft and a gap between the second interference portion and the pinion shaft. It is possible to suppress looseness during rotation of the second drive shaft.

An embodiment of the present technology may further include a planetary gear mechanism and a second generator. The planetary gear mechanism may comprise a sun gear, a second ring gear and a planetary carrier. A first generator may be connected to the sun gear. A blade and a second generator may be connected to the second ring gear. With such a configuration, a transaxle for a hybrid electric vehicle can be used as part of the electric power generating device.

First Embodiment

Configuration of Wind Electric Power Generating Device 1

Figure 1:
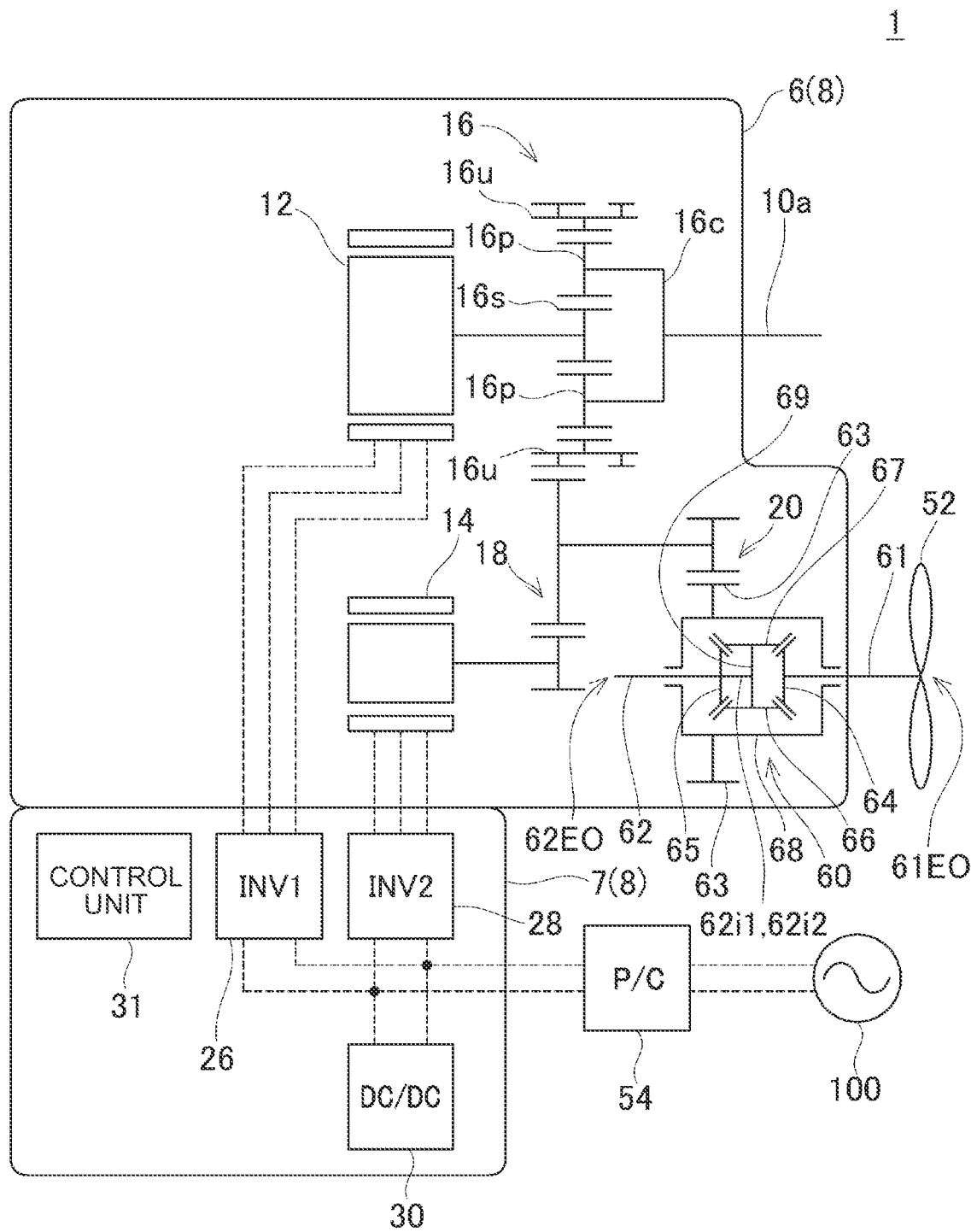
FIG. 1 is a diagram schematically showing the configuration of a wind electric power generating device 1.

A wind electric power generating device 1 will be described with reference to FIG. 1. The wind electric power generating device 1 mainly includes a hybrid unit 8, blades 52 and a power conditioner 54.

First, the hybrid unit 8 will be explained. As shown in FIG. 1, the wind electric power generating device 1 of this embodiment uses a hybrid unit 8 for a hybrid electric vehicle. A hybrid unit 8 is a power unit connected to wheels in a hybrid electric vehicle. The hybrid unit 8 mainly includes transaxle 6 and electric power control unit 7. The hybrid unit 8 may be new or second hand.

The transaxle 6 mainly includes a first motor generator 12, a second motor generator 14, a planetary gear mechanism 16 and a differential gear mechanism 60. The planetary gear mechanism 16 is positioned between the engine shaft 10a and the first motor generator 12. One end of the engine shaft 10a is connected to the first motor generator 12 via a planetary gear mechanism 16. Nothing is connected to the other end of the engine shaft 10a. The first motor generator 12 is a motor generator that has a smaller rated output and a smaller starting torque than the second motor generator 14.

The planetary gear mechanism 16 has a sun gear 16s, a plurality of planetary gears 16p, a planetary carrier 16c, and a ring gear 16u. The sun gear 16s is connected to the first motor generator 12. A plurality of planetary gears 16p is arranged around the sun gear 16s and is engaged with the sun gear 16s. The planetary carrier 16c rotatably supports a plurality of planetary gears 16p and is connected to the engine shaft 10a. The ring gear 16u is positioned around the multiple planetary gears 16p and engages with the multiple planetary gears 16p. The ring gear 16u is connected to the second motor generator 14 via the first speed reduction mechanism 18. Also, the ring gear 16u is connected to the ring gear 63 of the differential gear mechanism 60 via the second speed reduction mechanism 20.

A first drive shaft 61 and a second drive shaft 62 are connected to the differential gear mechanism 60. A blade 52 is connected to the outer end 61EO of the first drive shaft 61EO. On the other hand, nothing is connected to the outer end 62EO of the second drive shaft 62. The blade 52 is configured to be rotatable in response to fluid flow. A reducer, a speed increaser, or a transmission may be provided between the first drive shaft 61 and the blade 52 as necessary. A specific configuration of the differential gear mechanism 60 will be described later.

The electric power control unit 7 is provided integrally with the transaxle 6. The electric power control unit 7 includes a first inverter 26, a second inverter 28, a DC-DC converter 30, and a controller 31 for controlling them. The controller 31 may be a power control unit (PCU). First inverter 26 is electrically connected to first motor generator 12. Second inverter 28 is electrically connected to second motor generator 14.

DC-DC converter 30 is electrically connected to first motor generator 12 via first inverter 26 and is electrically connected to second motor generator 14 via second inverter 28. A power conditioner 54 is electrically connected to the electric power control unit 7. Power conditioner 54 is interposed between external electric power system 100 and electric power control unit 7. Electric power generated by first motor generator 12 and second motor generator 14 is supplied to power conditioner 54 via electric power control unit 7. The power conditioner 54 can supply generated electric power to the external electric power system 100 by interconnecting with the external electric power system 100.

As described above, a structure is realized in which the first motor generator 12 is connected to the sun gear 16s, and the second motor generator 14 and the blade 52 are connected to the ring gear 16u. In such a structure, the ratio between the number of rotations of the second motor generator 14 and the number of rotations of the blade 52 is fixed. On the other hand, the ratio between the number of revolutions of the first motor generator 12 and the number of revolutions of the blade 52 can be adjusted.

Configuration of the Differential Gear Mechanism 60

Figure 2:
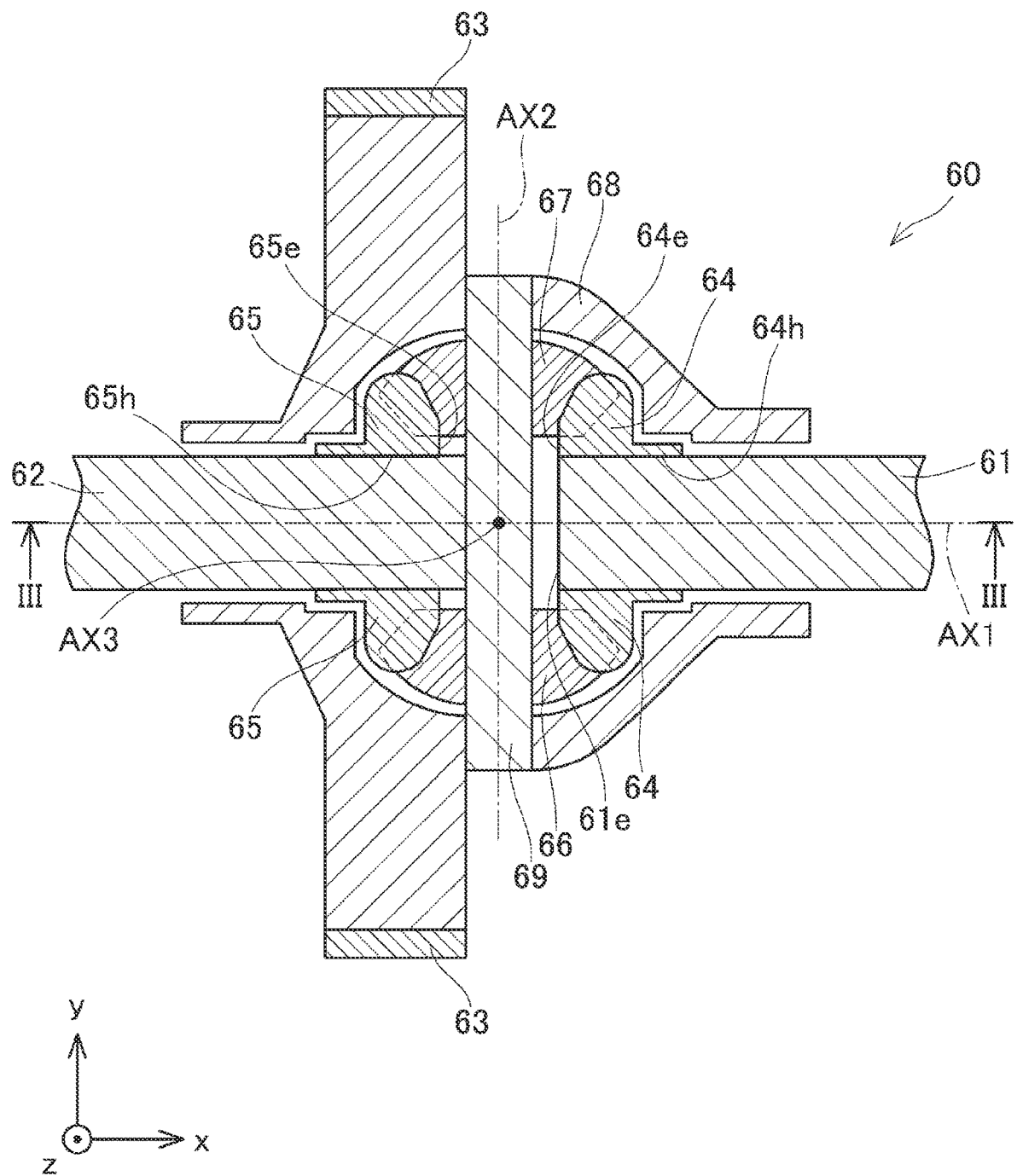
FIG. 2 is a schematic cross-sectional view of the differential gear mechanism 60 in Embodiment 1.
Figure 3:
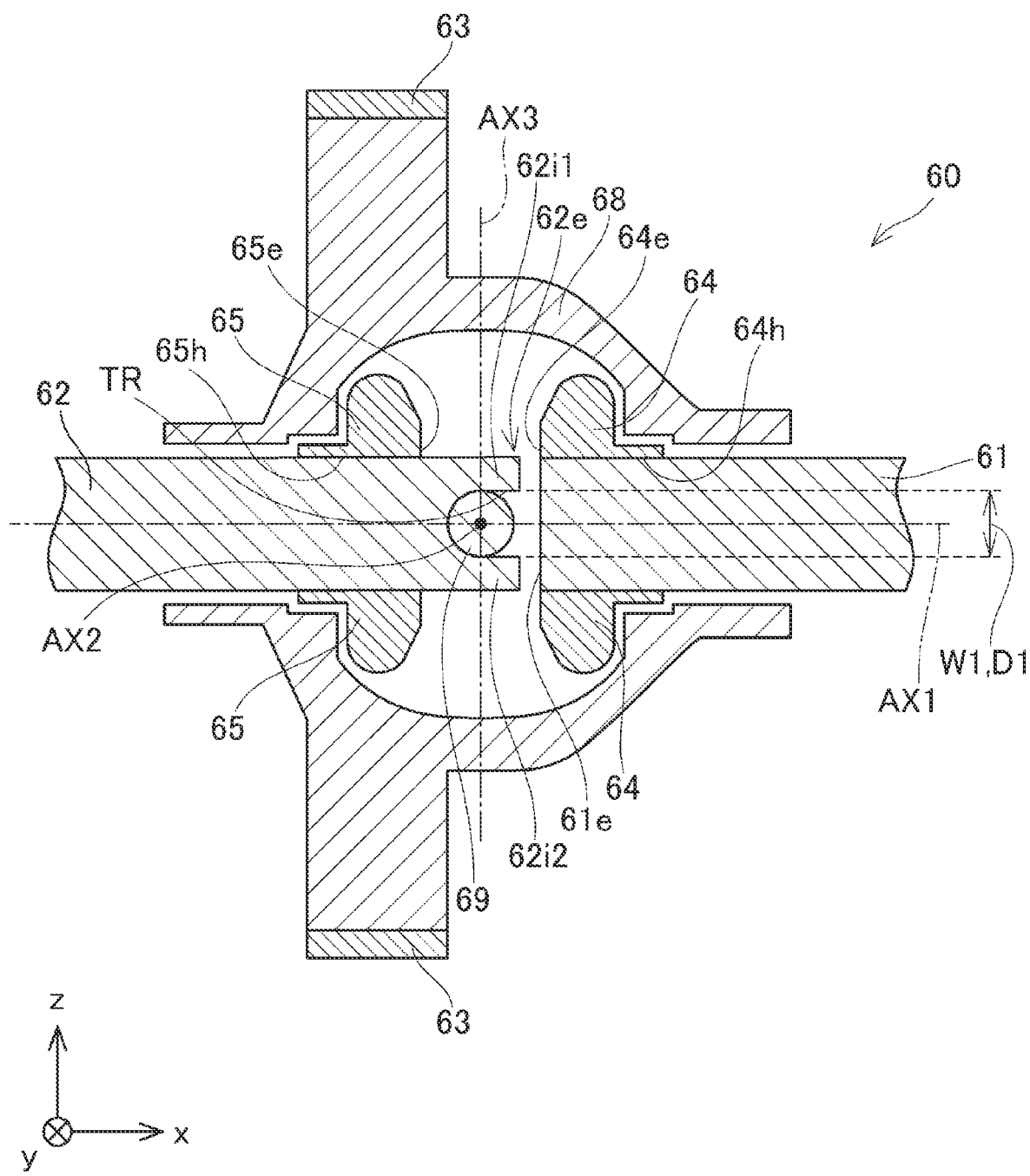
FIG. 3 is a schematic cross-sectional view of the differential gear mechanism 60 in Embodiment 1.

FIG. 2 and FIG. 3 show schematic cross-sectional views of the differential gear mechanism 60 in the first embodiment. FIG. 2 is a cross-sectional view along a plane including the first axis AX1 and the second axis AX2. FIG. 3 is a cross-sectional view taken along line III—in FIG. 2. FIG. 3 is a cross-sectional view of a plane including the first axis AX1 and the third axis AX3 and perpendicular to the second axis AX2.

The differential gear mechanism 60 includes a first drive shaft 61, a second drive shaft 62, a ring gear 63, a first side gear 64, a second side gear 65, a pair of pinion gears 66 and 67, a differential case 68, and a pinion shaft 69. The differential case 68 houses the first side gear 64, the second side gear 65, the pinion gears 66 and 67, and the pinion shaft 69. A ring gear 63 is arranged on the outer periphery of the differential case 68. That is, the differential case 68 is formed integrally with the ring gear 63. The differential case 68 rotates integrally with the ring gear 63 about the first axis AX1.

Pinion gears 66 and 67 are supported within differential case 68 by pinion shaft 69. The pinion gears 66 and 67 are rotatable around the second axis AX2, which is the rotation axis of the pinion shaft 69. The second axis AX2 is orthogonal to the first axis AX1. The first side gear 64 and the second side gear 65 are opposed to each other with a pinion shaft 69 interposed therebetween, and are engaged with a pair of pinion gears 66 and 67. That is, the pinion gears 66 and 67 connect the pair of first side gear 64 and second side gear 65 to each other.

The first drive shaft 61 is arranged along the first axis AX1 and is rotatable around the first axis AX1. An inner end portion 61e of the first drive shaft 61 is inserted into a shaft hole 64h of the first side gear 64 and fixed to the first side gear 64. The inner end portion 61e does not protrude from the inner end portion 64e of the first side gear 64.

The second drive shaft 62 is arranged along the first axis AX1 and is rotatable around the first axis AX1. An inner end portion 62e of the second drive shaft 62 passes through a shaft hole 65h of the second side gear 65 and is fixed to the second side gear 65.

A first interference portion 62i1 and a second interference portion 62i2 extending toward the pinion shaft 69 are arranged at the inner end portion 62e of the second drive shaft 62 (see FIG. 3). The first interference portion 62i1 and the second interference portion 62i2 protrude from the inner end portion 65e of the second side gear 65 toward the pinion shaft 69 (+x direction side). The first interference portion 62i1 and the second interference portion 62i2 face each other, and a U-shaped groove portion TR is formed therebetween. The groove portion TR extends in the y direction parallel to the second axis AX2.

Here, a third axis AX3 is defined that is orthogonal to the first axis AX1 and the second axis AX2. A width W1 of groove portion TR in the direction of third axis AX3 is substantially equal to diameter D1 of pinion shaft 69. A pinion shaft 69 is fitted in the groove portion TR. Accordingly, the pinion shaft 69 is positioned between the first interference portion 62i1 and the second interference portion 62i2. In other words, the first interference portion 62i1 and the second interference portion 62i2 face the pinion shaft 69 in the direction of the third axis AX3. Accordingly, the driving force input from the first drive shaft 61 to the differential case 68 can be transmitted to the second drive shaft 62 via the fitting structure between the pinion shaft 69 and the groove portion TR. Width W1 can be appropriately determined in consideration of the fitting tolerance between groove portion TR and pinion shaft 69.

Effect

Describe the task. A vehicle transaxle 6 is provided with a differential gear mechanism 60. Here, consider a case where the blade 52 is arranged on the first drive shaft 61 so that the first motor generator 12 generates electric power. In this case, since the driving force is input to the differential gear mechanism 60 only from the first drive shaft 61, the second drive shaft 62 idles and the driving force is not transmitted to the first motor generator 12. As a result, there is a problem that electric power cannot be generated. Therefore, in the wind electric power generating device 1 of this embodiment, the first interference portion 62$i$1 and the second interference portion 62$i$2 formed at the inner end portion 62$e$ of the second drive shaft 62 can be fitted to the pinion shaft 69. Thereby, the second drive shaft 62 and the differential case 68 can be rotated together. The driving force input to the first drive shaft 61 does not idle the second drive shaft 62. The driving force input to the first drive shaft 61 by the blade 52 can be appropriately transmitted to the first motor generator 12. Electric power can be generated in the wind electric power generating device 1 having the differential gear mechanism 60 on the power transmission path.

Method for Manufacturing Wind Electric Power Generating Device 1

First, the hybrid unit 8 without the first drive shaft 61 and the second drive shaft 62 is prepared. The inner end portion 61$e$ of the first drive shaft 61 is inserted into the shaft hole 64$h$ of the first side gear 64 (see FIGS. 2 and 3). Since the first drive shaft 61 does not need to include the first interference portion 62$i$1 and the second interference portion 62$i$2, a conventional drive shaft can be used.

The inner end portion 62$e$ of the second drive shaft 62 is inserted through the shaft hole 65$h$ of the second side gear 65. Then, the pinion shaft 69 is fitted into the groove portion TR formed in the inner end portion 62$e$. Then, the wind electric power generating device 1 is completed by appropriately connecting the power conditioner 54 and the blade 52.

The second drive shaft 62 having the first interference portion 62$i$1 and the second interference portion 62$i$2 formed at the inner end portion 62$e$ is prepared and inserted into the differential gear mechanism 60, so that the second drive shaft 62 can be attached to the differential case 68. Only the second drive shaft 62 needs to be machined, and the differential gear mechanism 60 does not need to be specially machined. Since disassembly and modification of the hybrid unit 8 can be eliminated, the existing hybrid unit 8 can be used as it is. The manufacturing cost of the wind electric power generating device 1 can be reduced.

Second Embodiment

Figure 4:
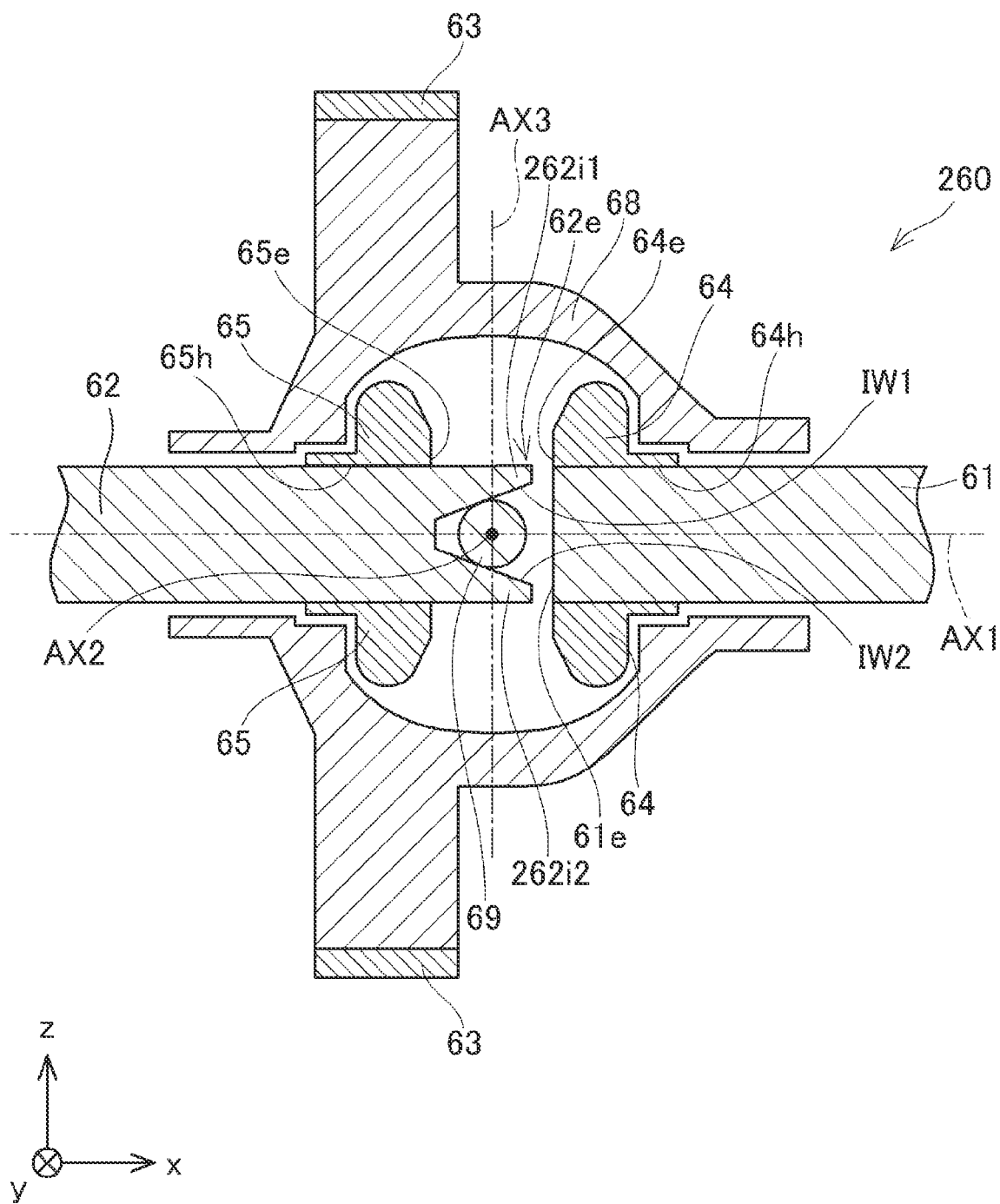
FIG. 4 is a schematic cross-sectional view of a differential gear mechanism 60 according to the second embodiment.

FIG. 4 shows a schematic cross-sectional view of the differential gear mechanism 260 in the second embodiment. FIG. 4 is a cross-sectional view at the same location as in FIG. 3. The differential gear mechanism 260 (FIG. 4) of Example 2 differs from the differential gear mechanism 60 (FIG. 3) of Example 1 in the shapes of the first interference portion 262$i$1 and the second interference portion 262$i$2. Parts common to the first and second embodiments are denoted by the same reference numerals, and descriptions thereof are omitted.

The first interference portion 262$i$1 has an inner wall IW1 facing the pinion shaft 69 and parallel to the second axis AX2. The inner wall IW1 has a taper such that the thickness of the first interference portion 262$i$1 in the direction of the third axis AX3 decreases toward the tip side (+x direction side) of the first interference portion 262$i$1. Similarly, the second interference portion 262$i$2 has an inner wall IW2 facing the pinion shaft 69 and parallel to the second axis AX2. The inner wall IW2 has a taper such that the thickness of the second interference portion 262$i$2 in the direction of the third axis AX3 decreases toward the distal end side (+x direction side) of the second interference portion 262$i$2. As a result, the distance between the first interference portion 262$i$1, the second interference portion 262$i$2, and the direction of the third axis AX3 increases toward the distal end side (+x direction side) of the interference portion.

The inner wall IW1 and the inner wall IW2 are in line contact with the pinion shaft 69. The second drive shaft 62 may be pressed against the pinion shaft 69 by a spring mechanism (not shown) or the like.

Effect

Only by inserting the second drive shaft 62 to the limit in the +x direction, the tapered structure allows the inner walls IW1 and IW2 to come into line contact with the pinion shaft 69 in a self-aligning manner. A gap between the first interference portion 262$i$1 and the pinion shaft 69 and a gap between the second interference portion 262$i$2 and the pinion shaft 69 can be eliminated. It is possible to suppress rattling when the second drive shaft 62 rotates.

Although the embodiments have been described in detail above, they are merely examples and do not limit the scope of the claims. The technology described in the claims includes various modifications and changes of the specific examples illustrated above. The technical elements described in this specification or in the drawings exhibit technical usefulness either singly or in various combinations, and are not limited to the combinations described in the claims as filed. In addition, the techniques exemplified in the present specification or drawings achieve multiple purposes at the same time, and the achievement of one of them itself has technical utility.

Modified Examples

According to the technical concept of this specification, it is sufficient that the second drive shaft 62 has an interference portion facing the pinion shaft 69 in the direction of the third axis AX3. Therefore, the form of interference between the inner end portion 62$e$ of the second drive shaft 62 and the pinion shaft 69 is not limited to fitting, and may be various. For example, one of the first interference portion 62$i$1 and the second interference portion 62$i$2 may not exist.

What is claimed is:

1. An electric power generating device, comprising:
   a blade configured to rotate under a flow of a fluid;
   a first generator configured to generate electric power by rotation of the blade; and
   a differential gear mechanism provided between the blade and the first generator, wherein:
   the differential gear mechanism includes
   a first ring gear connected to the first generator;
   a case configured to rotate integrally with the first ring gear about a first axis, a pinion shaft that is supported by the case and that supports a pair of pinion gears to be rotatable about a second axis orthogonal to the first axis, a first drive shaft that is disposed along the first axis, and that includes at one end a first side gear that engages the pinion gears, and also of which another end is connected to the blade, and a second drive shaft that is disposed along the first axis and that includes at one end a second side gear engaged with the pinion gears and disposed facing the first side gear;

the one end of the second drive shaft is provided with an interference portion extending toward the pinion shaft; and the interference portion contacts the pinion shaft and faces in a direction along a third axis that is orthogonal to the first axis and the second axis.

2. The electric power generating device according to claim 1, wherein:

the interference portion includes a first interference portion and a second interference portion that face each other; and the pinion shaft is situated between the first interference portion and the second interference portion.

3. The electric power generating device according to claim 2, wherein a distance between the first interference portion and the second interference portion in the direction of the third axis increases the farther toward a distal end side of the interference portion.

4. The electric power generating device according to claim 1, further comprising a planetary gear mechanism and a second generator, wherein:

the planetary gear mechanism includes a sun gear, a second ring gear, and a planetary carrier;

the first generator is linked to the sun gear; and the blade and the second generator are connected to the second ring gear.

\* \* \* \* \*